(12) United States Patent
Fu et al.

(10) Patent No.: US 11,586,839 B2
(45) Date of Patent: Feb. 21, 2023

(54) CODE COMPLETION OF METHOD PARAMETERS WITH MACHINE LEARNING

(71) Applicant: MICROSOFT TECHNOLOGY LICENSING, LLC., Redmond, WA (US)

(72) Inventors: Shengyu Fu, Redmond, WA (US); David Poeschl, Kirkland, WA (US); Neelakantan Sundaresan, Bellevue, WA (US); Shuo Zhang, Bellevue, WA (US); Ying Zhao, Redmond, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 1115 days.

(21) Appl. No.: 16/208,455

(22) Filed: Dec. 3, 2018

(65) Prior Publication Data
US 2020/0175316 A1 Jun. 4, 2020

(51) Int. Cl.
*G06F 9/44* (2018.01)
*G06K 9/62* (2022.01)
*G06N 20/00* (2019.01)
*G06F 8/70* (2018.01)
*G06F 8/33* (2018.01)

(52) U.S. Cl.
CPC ............ *G06K 9/6215* (2013.01); *G06F 8/33* (2013.01); *G06F 8/70* (2013.01); *G06K 9/6228* (2013.01); *G06N 20/00* (2019.01)

(58) Field of Classification Search
None
See application file for complete search history.

(56) References Cited

U.S. PATENT DOCUMENTS

| 10,528,329 B1* | 1/2020 | Doyle | G06F 8/31 |
| 11,221,831 B1* | 1/2022 | Al Khafaji | G06F 8/33 |
| 2020/0372304 A1* | 11/2020 | Kenthapadi | G06F 16/285 |

OTHER PUBLICATIONS

Asaduzzaman, et al., "Exploring API Method Parameter Reconmendations", In Proceedings of The IEEE International Conference on Software Maintenance and Evolution, Sep. 29, 2015, pp. 271-280.
Li, et al., "Lexical Similarity Between Argument and Parameter Names: An Empirical Study", In Journal of The IEEE Access, vol. 6, Oct. 10, 2018, pp. 58461-58481.
"International Search Report and Written Opinion Issued in PCT Application No. PCT/US19/063126", dated Mar. 25, 2020, 13 Pages.
Walen, Terry Van., "Method Call Argument Completion using Deep Neural Regression", Retrieved From: https://research.infosupport.com/wp-content/uploads/Method-Call-Argument-Completion-using-Deep-Neural-Regression-Thesis-Terry-van-Walen.pdf, Aug. 24, 2018. 46 Pages.
Zhang, et al., "Automatic Parameter Recommendation For Practical API Usage", In Proceedings of The 34th International Conference on Software Engineering, Jun. 2, 2012, pp. 826-836.

* cited by examiner

*Primary Examiner* — Insun Kang

(57) ABSTRACT

A code completion tool uses machine learning models to more precisely predict the likelihood of the parameters of a method invocation. A score is computed for each candidate variable that is used to rank the viability of a variable as the intended parameter. The score is a weighted sum of a scope factor, an edit distance factor and a declaration proximity factor. The factors are based on a scope model, a method overload model, and a weight file trained offline on a training set of source code programs utilizing various method invocations.

20 Claims, 7 Drawing Sheets

US 11,586,839 B2

CODE COMPLETION OF METHOD PARAMETERS WITH MACHINE LEARNING

BACKGROUND

Software development environments are often used to aid software developers (i.e., users, programmers, etc.) to develop program code. The software development environment may include a source code editor and other tools that the developers utilize to write and test their programs. Some software development environments provide assistance for the developer to write code by automatically presenting a list of possible candidates based on one or more characters (e.g., letters, symbols, etc.) that a developer has typed into a source code editor. A popup menu may appear with several suggested code elements, phrases, or entities that the developer may utilize. This assistance is beneficial since it speeds up the development time and reduces common errors, such as typos. However, the automatic code completion feature may be problematic when there is a large list of candidates which may not be relevant and/or which may be too lengthy for a developer to browse through to find the right element.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A machine learning technique is used to determine the more likely variables of a program that can be candidates to complete the parameters of a method invocation. Each candidate variable is given a score that is used to rank the variables so that the more likely variables are identified. The score is a weighted sum of three factors: a scope score, an edit distance score, and a declaration proximity score. The scope score measures the probability that a variable's scope is used in a particular parameter position of a method invocation. The probabilities are based on a scope model having been pre-trained on a training set of parameter-based method invocations. The edit distance score measures the similarity between the variable's name and the parameter's name. The declaration proximity measures the distance between the variable's declaration and the method invocation. Each of these factors is weighted by a corresponding weight that is trained through logistic regression on the training set.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
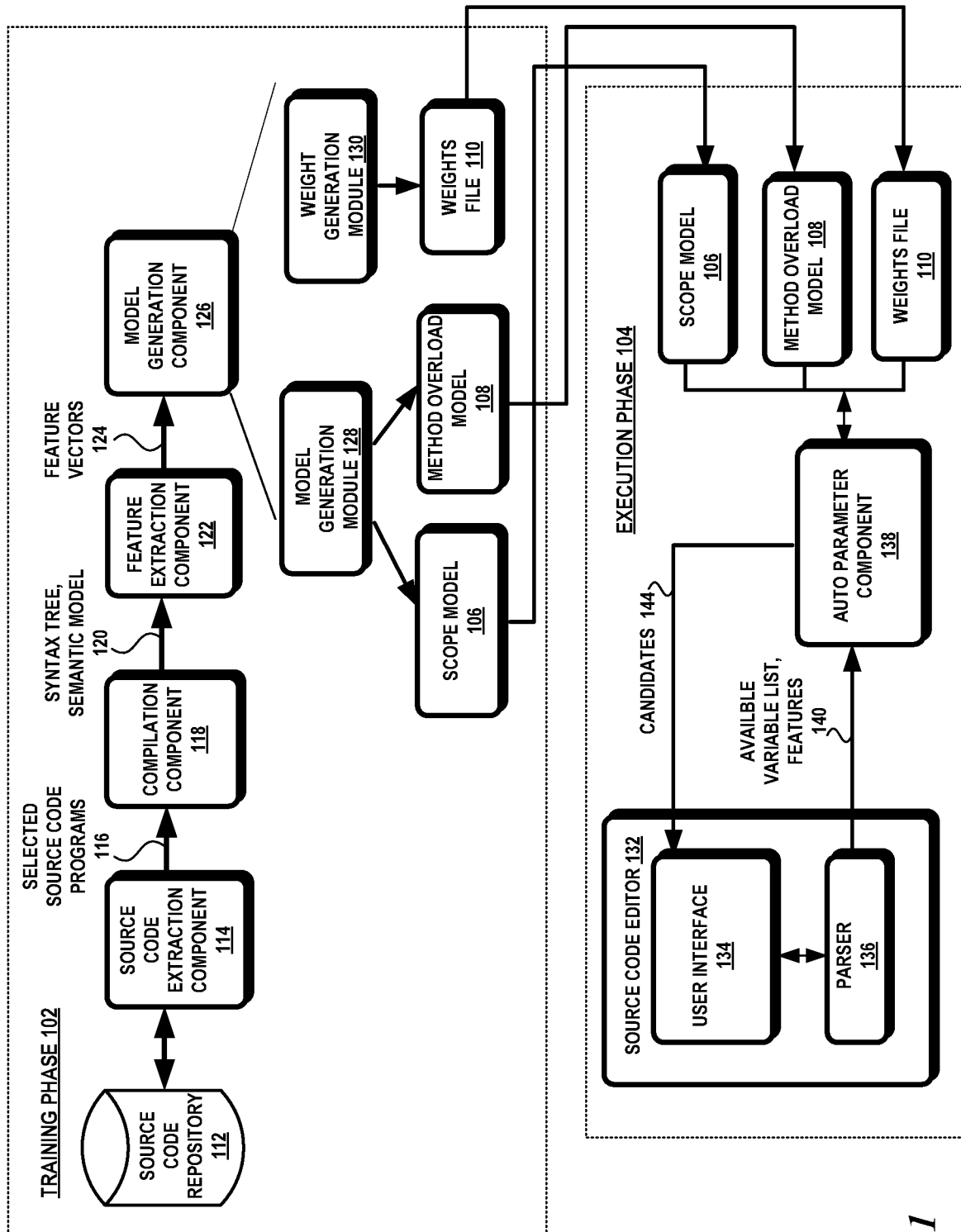
FIG. 1 illustrates an exemplary code completion system including a training phase and an execution phase that generates and uses machine learning models for code completion of method parameters.

The subject matter disclosed pertains to a mechanism for automatically generating candidate variables to complete the parameters of a method invocation. There are typically a large number of variables in a program that can be considered as potential candidates for a particular position of a method invocation. In order to generate a list of candidates more likely to complete the parameters or arguments of a method invocation, a machine learning approach is used.

A method invocation is the issuance of a call to a method or property of a class. A method may utilize zero or more parameters. A class may have overloaded methods which are methods with different parameters and with the same name. The variables of a program are used as the parameters of a method invocation. A variable is an item of data named by an identifier. In order to determine the more likely variables that could be parameters of a method invocation, the techniques described herein consider the context of a variable in the program, the context of the method invocation, and the context of the class associated with the method invocation.

In one aspect, these contexts are defined by the following features: the position of a method invocation within the program (e.g., span start); the name of the class associated with the method invocation; the name of the method invoked and the types of the parameters of the invoked method; the name of the class that contains the called method; the method that contains the invoked method and the types of the parameters in the contained method; the class names of the parameters of the invoked method; the types of the parameters; the scope of the parameters, and the available variable list. The available variable list is the list of variables in the source code that would reach the method invocation and could be considered viable candidates as parameters for the method invocation. These features are used to train a scope model, a method overload model, and a weight file.

The term "scope" is typically used with respect to programming languages to define the visibility of a variable or method within a program. The scope of a variable or method is limited to the code blocks where the variable is defined. The scope of a variable, including a method, is associated with an attribute that includes local, parameter, field, literal, property or method. The method attribute refers to potential argument could be a method. The local attribute refers to variables that are defined within a local code block only. The local code block can be a method or class. The parameter attribute refers to variables that are defined within a method invocation. The field attribute indicates that the variable is a private or static instance variable. A property attribute refers to an accessor method of a class. A literal attribute refers to a fixed value or constant. The scope model has the probability that a parameter in a particular parameter position of method invocation is associated with a particular scope attribute.

The method overload model contains the different probabilities associated with the different method signatures for an overloaded method. The method overload model is used to predict the method signature a user intends to use as the user types arguments in a method invocation. The method overload model is trained on various source code programs that contain the different method signatures used in a method invocation of an overloaded method.

The machine learning approach generates a score that is assigned to select variables of a program. The score represents the probability that a variable could be a parameter in a particular position of a method invocation. The score is a weighted sum of three sub-scores: a scope score; an edit distance score; and a declaration proximity score. The scope score indicates how likely a variable having a certain scope attribute is likely to be the parameter. The scope score utilizes the scope model to obtain an associated probability. The edit distance score measures the similarity between a variable name and a parameter name. The declaration proximity score measures how close a variable's declaration is to the method invocation at issue. Each of these scores is associated with a weight which emphasizes the relative importance of one factor over the other factors. The weight file includes weights that are used to influence the sub-scores that are considered in each variable score. The weights are trained offline using logistic regression on the variables in the source code programs in the training set.

Attention now turns to a further discussion of the system, devices, components, and methods utilized in the code completion system.

Method Parameter Machine Learning Code Completion System

FIG. 1 illustrates a block diagram of an exemplary code completion system 100 in which various aspects of the invention may be practiced. As shown in FIG. 1, system 100 includes a training phase 102 and an execution phase 104. The training phase trains machine learning models, such as a scope model 106, a method overload model 108, and a weight file 110 which is used by the execution phase 104 to predict the more likely candidate variables for the parameters of a method invocation. Code completion is a feature in which an application predicts the rest of a word or fragment of code that a user is typing. Examples of code completion systems include, without limitation, Microsoft's IntelliSense, Jetbrain's Intellij IDEA, Eclipse Code Recommenders, and the like.

The training phase 102 may utilize a source code repository 112, a source code extraction component 114, a compilation component 118, a feature extraction component 122, and a model generation component 126 to generate a scope model 106, a method overload model 108 and a weight file 110. The execution phase 104 may utilize a source code editor 132, an auto parameter component 138, the scope model 106, the method overload model 108 and the weights file 110.

In the training phase 102, the source code extraction component 114 extracts selected source code programs 116 from a source code repository 112 to train the machine learning models, 106, 108, 110. A compilation component 118 compiles the selected source code programs 116 to generate a syntax tree and semantic model 120. In one aspect, the compilation component 118 may be a front-end compiler, a parser, or a language compiler.

A syntax tree or abstract syntax tree represents the syntactic structure of the program in a hierarchical or tree structure. The syntax tree is a data structure that includes nodes that represent a construct in the grammar of the programming language of the program. The semantic model includes all the semantic information about the program. The semantic model includes information on the symbols referenced at a specific location in the program. Every namespace, type, method, property, field, event, parameter, label, and local variable maybe represented by a symbol. Symbols may also include additional information that a compiler determines from the program, such as methods and properties associated with the symbol. The semantic model encapsulates all this data into a data structure referred to as the semantic model.

The syntax tree and the semantic model 120 of each selected source code program is passed to the feature extraction component 122. The feature extraction component 122 extracts certain features from the syntax tree and semantic model. A feature is a discriminable characteristic that represents the context of the parameters used in the method invocation. There are several features extracted from each method invocation, parameters, and variables and these features comprise a feature vector.

In one aspect, the features may include one or more of the following: the position of a method invocation within the program (e.g., span start); the name of the class associated with the method invocation; the name of the method invoked and the types of the parameters of the invoked method; the name of the class that contains the called method; the method that contains the invoked method and the types of the parameters in the contained method; the class names of the parameters of the invoked method; the types of the parameters; the scope of the parameters, and the available variable list.

The model generation component 126 may include a model generation module 128 and a weight generation module 130. The model generation module 128 produces a scope model 106 and a method overload model 108 and the weight generation module 130 produces the weights file.

The execution phase 104 may include a source code editor 132 and a parameter recommendation module 138. In one or more aspects, code completion may be a function or feature integrated into a source code editor and/or integrated development environment (IDE). Code completion may be embodied as a tool or feature that can be an add-on, plug-in, extension and/or component of a source code editor and/or IDE.

The source code editor 132 may include a user interface 134 and a parser 136. The user interface 134 includes a set of features or functions for writing and editing a source code program. The user interface 134 may utilize a pop-up window to present a list of possible candidates for completion thereby allowing a developer to browse through the candidates and to select one from the list. In this manner, code completion serves as documentation of the possible parameters for a method invocation associated with a class in addition to being an assistance to writing code quickly. The parser 136 reads the source code in the source code editor 132 and generates a corresponding syntax tree and semantic model 140. The parser 134 also updates the syntax tree and semantic model 140 as the developer creates and edits the source code in the source code editor 132.

At certain points in the editing process, the user interface 132 will detect that the user has entered a particular character which will initiate code completion. In one aspect, when the user presses predefined key strokes, such as 'Ctrl+Space', a list of recommendations appear. Alternatively, the recommendation list will appear as soon as the user starts typing an argument. After the user types the first letter of an argument, the recommendation list will show the potential candidates. However, after the user types in the second letter of the argument, the recommendation list is filtered by the existing letters and only shows the candidates starting with the existing letters.

The user interface 134 will then request candidates from the parameter recommendation module 138 to present in the user interface 134 for a particular method invocation. The auto parameter component 138 uses the scope model 106, the method overload model 108, and the weights file 110 in conjunction with a program's variable list, semantic model and syntax tree 140 to determine the more likely parameters for a method invocation. The candidates 144 are ranked by a weighted score and those with the highest weighted score are returned to the user interface 134.

The user interface 134 in turn provides the candidates 144 to the developer. In one aspect, the user interface 134 may provide the candidates from the auto parameter component 138 with other candidates from other code completion tools and/or provide the candidates from the machine learning based models separately. The techniques describe herein are not constrained to any particular mechanism for providing the candidates to a developer and the manner in which the candidates are displayed to the user (e.g., pop-up window, etc.).

It should be noted that FIG. 1 shows components of the system in one aspect of an environment in which various aspects of the invention may be practiced. However, the exact configuration of the components shown in FIG. 1 may not be required to practice the various aspects and variations in the configuration shown in FIG. 1 and the type of components may be made without departing from the spirit or scope of the invention. For example, the training phase 102 may be executed in one computing environment and the execution phase 104 may be executed in the same computing environment or in a separate computing environment.

Figure 2A:
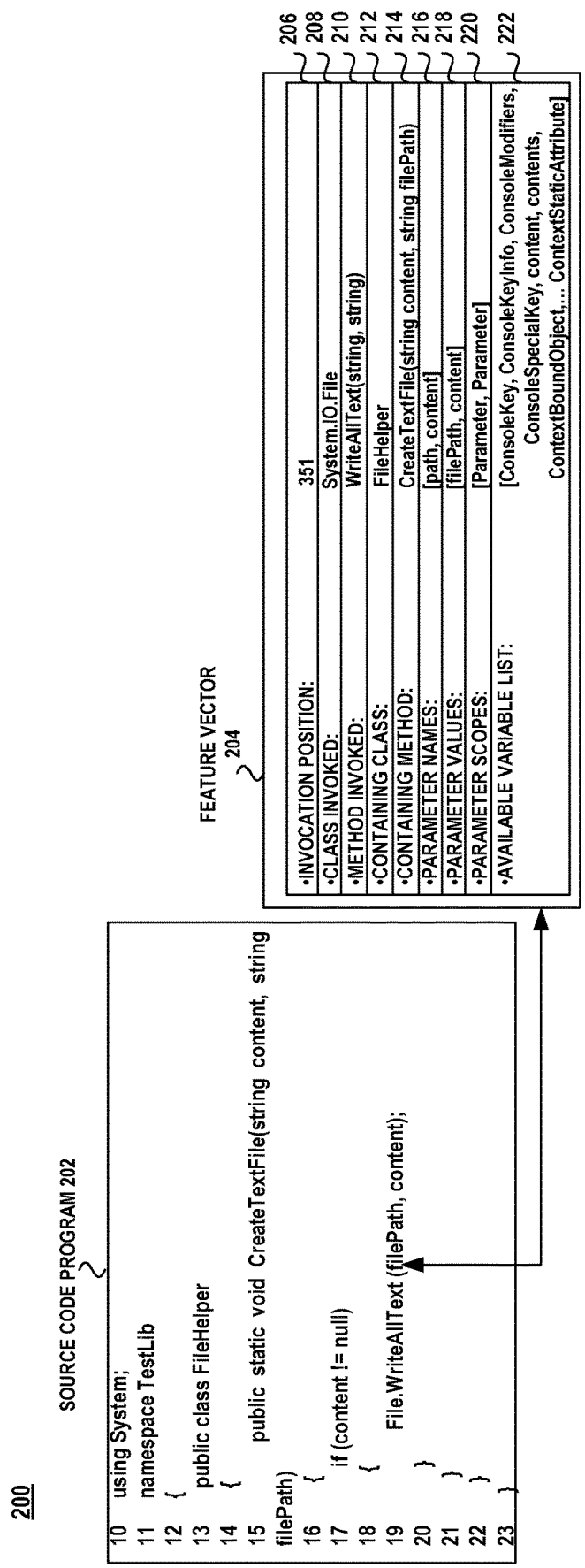
FIG. 2A is a schematic diagram illustrating the extraction of features from various source code programs that are used to train a scope model and a method overload model.

FIG. 2A illustrates the extraction of the features used to train the scope model and the method invocation model. FIG. 2A shows an exemplary source code program 202 and an exemplary feature vector 204 generated from the code portion shown in the exemplary source code program 202. The source code program 202 is written in the C #programming language. Line 10 includes the directive, "using System", that allows the use of types and classes in the System namespace. The "namespace TestLib" statement in line 11 defines a namespace in which the program resides. The statement "public class FileHelper" at line 13 defines the class FileHelper. The statement "public static void CreateTextFile(string content, string filePath)" at line 15 defines the method CreateTextFile which takes two string parameters, content and filePath. The statement at line 17, "if (content !=null)", is an expression that checks if the variable content has a null value. The statement at line 19, "File.WriteAllText(filePath, content)", is a method invocation of the method WriteAllText with the parameters, filePath and content. The File attribute before the period in the statement "File.WriteAllText(filePath, content)" indicates the class associated with the method.

The File.WriteAllText method is part of the System.IO.File class. The features that are extracted from this method invocation are placed into feature vector 204. Feature vector 204 includes the following features: the position of the method invocation relative to the start of the program, invocation position=351 (206); the name of the class invoked, class invoked=System.IO.file 208; the method signature of the invoked method, method invoked=WriteAllText(string, string) 210; the name of the class containing the invoked method, containing class=FileHelper 212; the name of the method including the invoked method, containing method=CreateTextFile(string content, string filePath) 214; parameter names=[path, content] 216; parameter values=[filePath, content] 218; parameter scopes=[parameter, parameter] 220; available variable list=all variables in the class 222. A feature vector is formed as shown in FIG. 2A for each method invocation having parameters found in a program selected to train the machine learning models.

Figure 2B:
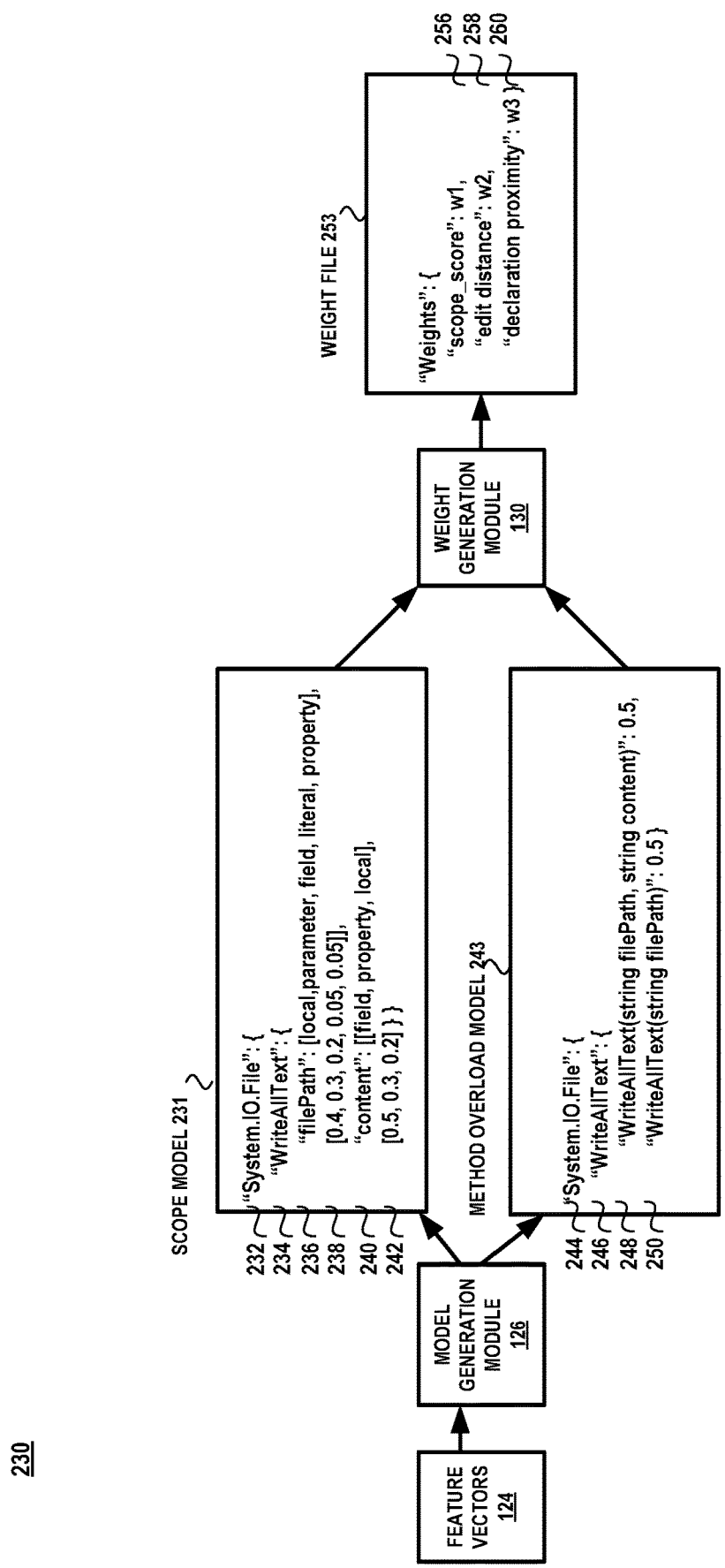
FIG. 2B is a schematic diagram illustrating the use of the extracted features to generate the scope model and the method overload model and the use of the scope model and the overload model to generate a weight file.

Turning to FIG. 2B, there is shown an exemplary diagram illustrating the use of the feature vectors. The feature vectors 124 are input into the model generation module 126 which uses them to generate a scope model 231 and a method overload model 243. An exemplary scope model 231 is shown in FIG. 2B for the method WriteAllText. The scope model 231 contains an entry for each class, for each method in the class and for each parameter of each method. For example, the scope model 231 shows the following: line 232 shows the entry for the class "System.IO.File"; line 234 shows the entry for the method "WriteAllText"; line 236 shows the entry for the parameter "filePath" and the scope attributes associated with this parameter, "local, parameter, field, literal, property"; line 238 represents the probabilities associated with each scope attribute; line 240 represents the second parameter for this method, "content", and the scope attributes associated with this parameter; and line 242 represents the probabilities associated with each scope attribute.

The method overload model 243 contains an entry for each overloaded method in each class. For example, the method overload model 243 has an entry for the "System.IO.File" class at line 244, an entry for the method "WriteAllText" in line 246, and two entries for each overload method associated with "WriteAllText" at lines 248, 250. Line 248 is the entry for the method signature "WriteAllText(string filePath, string content)" which contains an associated probability of 0.5. Line 250 is the entry for the method signature "WriteAllText(string filePath)" which contains an associated probability of 0.5.

The scope model 231 and the method overload model 243 are used by the weight generation module 130 to generate the weights used in the computation of a score for each variable in a program. In one aspect, the weight file 253 contains three weights, w1, w2, and w3, used to emphasis each factor of the score independently. As shown in FIG. 2B, there is a scope score weight, w1(line 256); an edit distance weight, w2 (line 258); and a declaration proximity weight, w3 (line 260).

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3:
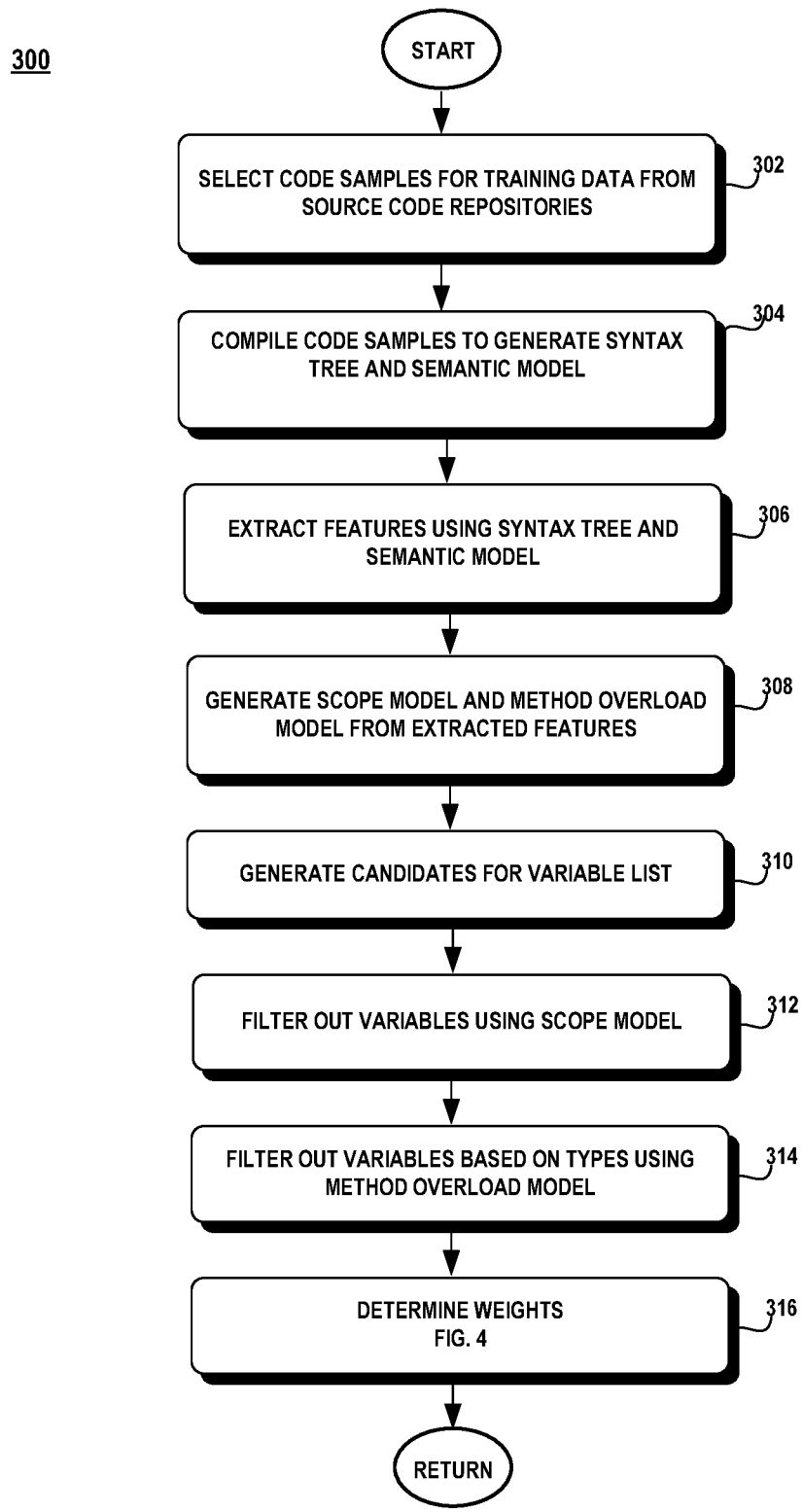
FIG. 3 is a flow diagram illustrating an exemplary method for generating the scope model, the method overload model and the weight file.

FIG. 3 illustrates an exemplary method illustrating the generation of the machine learning models for code completion. Referring to FIGS. 1 and 3, one or more source code repositories 112 are searched for source code programs written in a target programming language. The source code repositories 112 can be widely-used code repositories, such as GitHub, internal code repositories, and/or combinations thereof. The source code extraction component 114 extracts a number and type of source code programs that meet an intended target, such as source code programs that are accessed frequently, source code programs that utilize a particular function (e.g., database operations, computer graphics programs, etc.), source code programs that contain a large number of method invocations, and the like (collectively, block 302).

Each of the selected source code programs 116 are compiled by the compilation component 118 to produce data structures representing the syntax tree and semantic model of the source code program (block 304). The syntax tree and semantic model 120 are used by the feature extraction component 122 to extract characteristics representative of the context of a method invocation and the corresponding parameters (block 306).

The characteristics include the following: the position of a method invocation within the program (e.g., span start); the name of the class associated with the method invocation; the name of the method invoked and the types of the parameters of the invoked method; the name of the class that contains the called method; the method that contains the invoked method and the types of the parameters in the contained method; the class names of the parameters of the invoked method; the types of the parameters; the scope of the parameters, and the available variable list. The characteristics are configured into feature vectors which serve as the training and testing data for the models. In one aspect, the feature vector can be split with 80% used as training data and 20% used as testing data (block 306).

Next, the model generation module 128 uses the extracted features to generate the scope model and the method overload model (block 308).

The scope model represents for a parameter's position in a certain method, the probability of a scope attribute fitting a particular parameter position. The model generation module 128 receives the feature vectors and determines the scope attribute of each parameter used in the method invocation and computes a probability for each scope attribute. The probability associated with each scope attribute is based on the frequency that a method invocation uses a variable associated with a particular scope in that parameter position from all the selected source code programs in the training dataset.

The method overload file contains a probability representing the likelihood that a method signature will be used in a particular overloaded method. The method overload file contains an entry for each method signature of each overloaded method of a class. The model generation module 128 receives the feature vectors and determines the probability associated with each method signature is based on the frequency that a method signature is used in a method invocation from all the selected source code programs in the training dataset.

Next, variables from the available variable list are selected as potential variable candidates (block 310). Those variables associated with a scope attribute of local, method, parameters, field, literal, and property are selected. These scope attributes account for most of the scopes associated with parameters of a method invocation.

The potential variable candidates are then filtered to exclude those methods that cannot be found in the scope model and those variables not found in the scope model as being used as parameters in a method invocation (block 312). If the method cannot be found in the scope model, the scope filtering is skipped (block 312).

Next, the variables that do not have types consistent with the method signature of an overloaded method are eliminated (block 314). The method overload model contains the types of the parameters used in the overloaded methods. If the method cannot be found in the method overloads model then the type filtering is skipped. Otherwise, for those methods found in the method overload model, the type of the parameters is matched with the type of a potential variable candidate. If the types do not match, then the parameter is eliminated from the potential variable candidate list.

Next, the weights are trained based on the scores computed for each of the variables in the potential variable candidate list (block 316). A score is computed for each variable and the score reflects the viability of the variable being the intended parameter in a particular position of a method invocation. The score is a weighted sum of three sub-scores: a scope score; an edit distance score; and the declaration proximity score. The total score is represented mathematically as follows:

$$Score = w1*ScopeScore + w2*EditDistanceScore + w3*DeclarationProximityScore, \text{ where } w1, w2, \text{ and } w3 \text{ are weights.}$$

Figure 4:
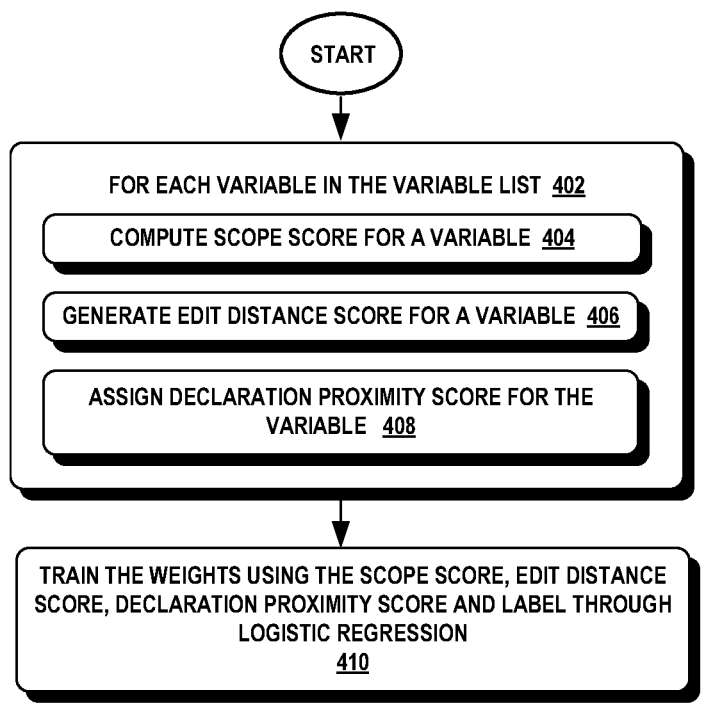
FIG. 4 is a flow diagram illustrating an exemplary method for training weights used to rank candidate variables.

Turning to FIG. 4, for each variable in the filtered potential variable candidate list, a scope score, an edit distance score, and a declaration proximity score is computed for the variable (blocks 402-408). The scope score, ScopeScore, measures the likelihood that a variable of a particular scope is the intended parameter. The ScopeScore is determined from the probability in the scope model that is associated with the variable's scope attribute.

The edit distance score, EditDistanceScore, measures the similarity between a candidate variable name and a parameter name by counting the minimum number of operations required to convert the string representing the candidate variable name into a string representing the parameter name. There are different edit distance algorithms that may be used, such as the Levenshtein distance, longest common subsequence, Lowrance-Wagner edit distance, and the like.

For example, consider the method invocation for the method foo.bar( ). The method has three overloads and in the overload model we can find the probabilities associated with each method signature as follows:

```
'foo': {
    'bar': {
        'bar(string name)': 0.5,
        'bar(string gender)': 0.3,
        'bar(string address)': 0.2}
    '}
}
```

In this example, there are three potential parameters and each parameter requires an edit distance calculation. Suppose a candidate name is 'val', then the edit distance calculations are generated as follows:

$$Editdistance(val, name) = 3, Editdistance(val, gender) = 6, Editdistance(val, address) = 7.$$

The three edit distances are combined into a single EditDistanceScore with the use of the method signature probabilities to calculate a weighted average edit distance as follows: AveragedEditDistance=0.5*3+0.3*6+0.2*7=4.7. To range the EditDistanceScore into [0,1], we go through a final transformation as follows: EditDistanceScore=1/(4.7+1)=0.1754. This final transformation 1/(x+1) also has another effect: it makes a similar variable name stand out. If x=0, which means the variable name exactly matches the parameter name, then 1/(x+1)=1; If x=1, 1/(x+1)=0.5, also pretty large; But if x=2, 1/(x+1)=0.333; x=3, 1/(x+1)=0.25; If x=3, 1/(x+1)=0.2, . . . . When this decreasing trend becomes slower as x becomes larger, this means there isn't a distinguishable difference between two variables both with very different names than the parameter name.

The declaration proximity score, DeclarationProximityScore, measures how close a variable's declaration is to the target method invocation. The declaration proximity score is computed as the difference between the span start of the method invocation and the span start of the variable's declaration over the span start of the method invocation. The span start is the location of the code element in the source code relative to the starting position of the source code file. Both the method invocation and variable declaration can be a syntax node in the syntax tree. Spanstart is a property of syntax node, which is the start point of the text span. The DeclarationProximityScore is the absolute value of the difference between two spanstarts normalized by the spanstart of the method invocation. However, the difference might not be within the range [0,1].

For example, the syntax node of the current method invocation has a spanstart of 50. For a variable in the list, we find the syntax node of its declaration is 30. Then the DeclarationProximityScore is calculated as (50−30)/50. If another candidate variable has a spanstart of 130 (it could be declared after the method invocation in the code script), then DeclarationProximityScore=(130−50)/50.

The weights w1, w2, and w3 are trained using the scope score, the edit distance score, and the declaration proximity score of each candidate variable through logistic regression (block 410). Each candidate variable has a ScopeScore, EditDistanceScore and DeclarationProximityScore and from the training data, each candidate variable is assigned a label with the value representing whether this variable was used as a parameter in the method invocation in the training data (e.g., where 1 represents selected and 0 represents not selected).

Logistic regression is used for binary classification to predict the probability of a candidate variable being selected by analyzing the candidate variable's scores and label. A candidate variable's scores and label are used to train a logistic regression model to optimize the weights to predict the probability that a candidate variable will be selected.

Figure 5:
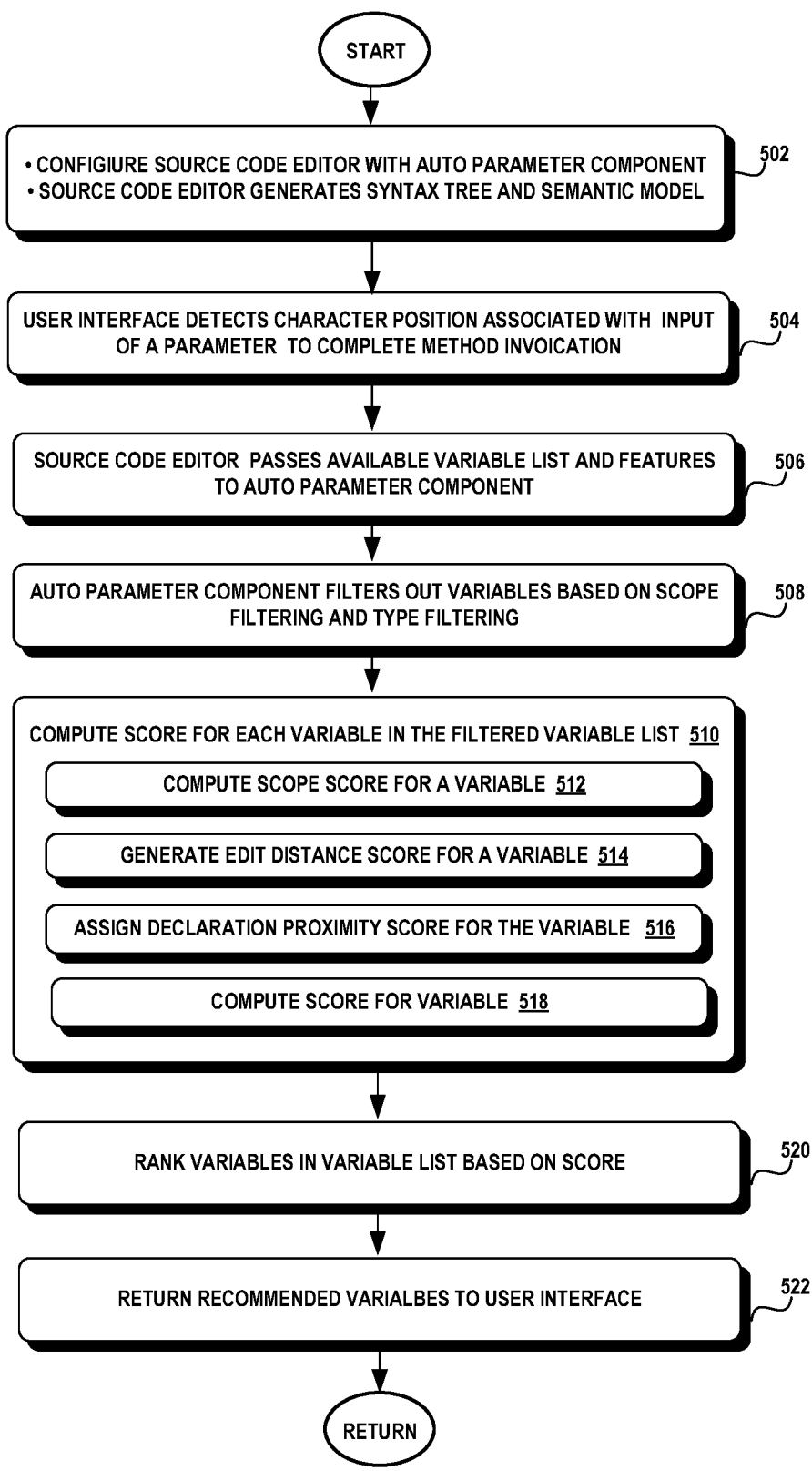
FIG. 5 is a flow diagram illustrating an exemplary method for utilizing the machine learning models for code completion.

FIG. 5 illustrates an exemplary method of code completion utilizing the machine learning models. Referring to FIGS. 1 and 5, code completion is performed in a development environment such as a source code editor 132. The source code editor 132 is configured to interact with an auto parameter component 138 (block 402). The auto parameter component may be a plug-in, add-on or extension to the source code editor. The source code editor may also utilize other code completion programs in addition to the auto parameter component. The source code editor 132 performs a background parsing process that parses the source code in the source code editor to generate and update the syntax tree and semantic model of the source code while a user is using the source code editor (block 402).

The user interface 134 of the source code editor 132 detects the input characters that a developer enters into the source code editor 132. The user interface may detect a combination of pre-defined key strokes or the first few letters of an argument (block 504). Upon detection of the trigger for the parameter completion, the parser generates the available variable list and the features, from the source code program currently in the source code editor, to the auto parameter component (block 506). The parser may utilize application program interfaces (APIs) to extract the variables for the available variable list and the features from the syntax tree and semantic model (block 506).

The auto parameter component 138 filters out variables from the available parameter list using the scope model and the method overload model as described above. Those variables not associated with a scope attribute found in the scope model are eliminated from the available variable list. Those variables associated with a type that does not match the type of the parameter position of the method signature of the invoked method are eliminated from the available parameter list (block 508).

A score is then computed for each variable remaining in the filtered available variable list (block 510). The score is a weighted sum of three sub-scores which is represented mathematically as follows:

$$Score=w1*ScopeScore+w2*EditDistanceScore+w3*DeclarationProximityScore, \text{where } w1, w2, \text{ and } w3 \text{ are weights}.$$

In order to compute the score for the variable, the scope score is computed (block 512), the edit distance score is computed (block 514) and then the declaration proximity score (block 516). The weights from the weight file are applied a respective sub-score and the weighted sum is computed and assigned as the variable's score (block 518).

The variables in the available variable list are then ranked in descending order with the variable having the highest score ranked first and the variable having the lowest score ranked last (block 520). After ranking, eliminate the already used variables in the current method invocation since it rare that the same two arguments are used in the same method invocation. A threshold number of variables is then returned to the user interface as the candidates for fitting in the parameter position of the method invocation (block 522). The threshold may be a pre-configured user setting or a system setting.

Exemplary Operating Environment

Figure 6:
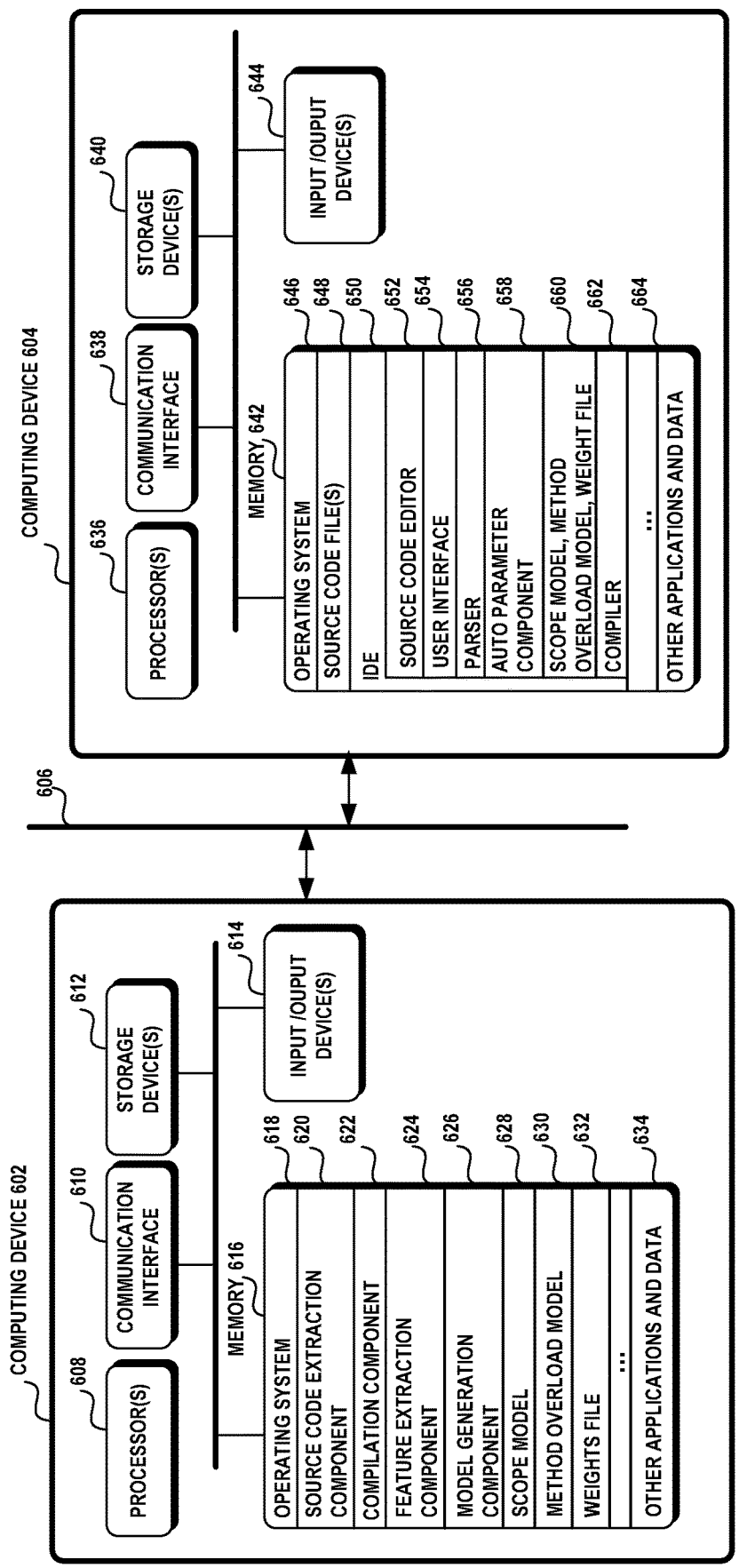
FIG. 6 is a block diagram illustrating an exemplary operating environment.

Attention now turns to a discussion of an exemplary operating environment. FIG. 6 illustrates an exemplary operating environment 600 in which a first computing device 602 is used to train the machine learning models and a second computing device 604 uses the machine learning models for code completion. However, it should be noted that the aspects disclosed herein is not constrained to any particular configuration of devices. Computing device 602 may utilize the machine learning models in its own code completion system and computing device 604 may generate and test machine learning models as well. Computing device 602 may be configured as a cloud service that generates machine learning model as a service for other code completion systems. The operating environment is not limited to any particular configuration.

The computing devices 602, 604 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 600 may be configured in a network environment, a distributed environment, a multi-processor environment, or a stand-alone computing device having access to remote or local storage devices.

The computing devices 602, 604 may include one or more processors 608, 636, a communication interface 610, 638, one or more storage devices 612, 640, one or more input/output devices 614, 644, and a memory 616, 642. A processor 608, 636 may be any commercially available or customized processor and may include dual microprocessors and multi-processor architectures. The communication interface 610, 638 facilitates wired or wireless communications between the computing device 602, 604 and other devices. A storage device 612, 640 may be computer-readable medium that does not contain propagating signals, such as modulated data signals transmitted through a carrier wave. Examples of a storage device 612, 640 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 612, 640 in the computing devices 602, 604. The input/output devices 614, 644 may include a keyboard, mouse, pen, voice input device, touch input device, display, speakers, printers, etc., and any combination thereof.

A memory 616, 642 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 616, 642 may also include one or more external storage devices or remotely located storage devices that do not pertain to propagated signals, such as modulated data signals transmitted through a carrier wave.

Computing device 604 may utilize an integrated development environment (IDE) 620 that allows a user (e.g., developer, programmer, designer, coder, etc.) to design, code, compile, test, run, edit, debug or build a program, set of programs, web sites, web applications, and web services in a computer system. Software programs can include source code files 618, created in one or more source code languages (e.g., Visual Basic, Visual J #, C++. C #, J #, Java Script, APL, COBOL, Pascal, Eiffel, Haskell, ML, Oberon, Perl, Python, Scheme, Smalltalk and the like). The IDE 650 may provide a native code development environment or may provide a managed code development that runs on a virtual machine or may provide a combination thereof. The IDE 650 may provide a managed code development environment using the .NET framework. It should be noted that this operating embodiment is not constrained to providing the source code development services through an IDE and that other tools may be utilized instead, such as a stand-alone source code editor and the like.

A user can create and/or edit the source code files 648 according to known software programming techniques and the specific logical and syntactical rules associated with a particular source language via a user interface 654 and a source code editor 652 in the IDE 650. Thereafter, the source code files 648 can be compiled via a compiler 662, such as a front end or language compiler. During this compilation process, the front-end compiler 662 generates data structures representing the syntactic structure and semantic model of the source code.

The memory 642 may contain instructions, components, and data. A component is a software program that performs a specific function and is otherwise known as a module, program, and/or application. The memory 642 may include an operating system 646, one or more source code files 648, an IDE 650 that may include a source code editor 652, a user interface 654, a parser 656, an auto parameter component 658, the machine learning models including the scope model, the method overload model and the weight file 660, a compiler 662, and other applications and data 664. Memory 616 may include an operating system 618, a source code extraction component 620, a compilation component 622, a feature extraction component 624, a model generation component 626, a scope model 628, a method overload model 630, a weights file 632, and other applications and data 634.

The computing devices 602, 604 may be communicatively coupled via a network 606. The network 606 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 606 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

CONCLUSION

A system is disclosed having at least one processor and a memory. The memory stores at least one module containing instructions that when executed by the at least one processor perform actions that: generate a candidate variable list of candidates, a candidate including variables and/or methods in a source code program likely to fit as a parameter in a select parameter position of a current method invocation; calculate a score for each candidate, the score based on a weighted sum of a scope score, an edit distance score, and a declaration proximity, the weighted sum indicative of a probability of a candidate likely to fit as the select parameter in the current method invocation; and recommend at least one of the candidates based on a highest probability for use in the source code program.

The probability assigned to the scope attribute is based on a frequency of the current method invocation using the scope attribute in a select parameter position from a plurality of source code programs using the current method invocation. The scope attribute assigned to each candidate is based on features extracted from the source code program that correspond to a context of the method invocation and usage of the candidate. The scope attribute is selected from one of method, property, local, field, literal, and parameter.

The system performs further actions that generate a scope score for each candidate based a scope attribute assigned to each candidate and a probability assigned to the scope attribute, generate an edit distance score for each candidate, the edit distance score measures a similarity of a name of a select variable and/or method to a name associated with the select parameter; generate a declaration proximity score, the declaration proximity score represents a proximity of a location of a declaration of a candidate in the source code program to a location in the source code program of the current method invocation.

The system applies a first weight to the scope score, a second weight to the edit distance score, and a third weight to the declaration proximity score, wherein each weight adjusts a respective score based on usage of the current method invocation in training data that uses the current method invocation. The system also applies linear regression to determine the first weight, the second weight, and the third weight based on a label, a scope score, an edit score, and a declaration proximity score associated with candidates taken from training data of a plurality of source code programs using method invocations, wherein a candidate is associated with a label to indicate whether or not the candidate was used as a parameter in a method invocation in the training data.

The edit distance score is a weighted sum of an edit distance for each parameter of each method signature of the current method invocation. The weight for an edit distance is based on a frequency of usage of a method signature in training data of source code programs that utilize the current method invocation.

A method is performed in a device having at least one processor and a memory. The method comprises: generating a candidate variable list of candidates, a candidate including variables and/or methods in a source code program likely to fit as a parameter in a select parameter position of a current method invocation; calculating a score for each candidate, the score based on a weighted sum of a scope score, an edit distance score, and a declaration proximity, the weighted sum indicative of a probability of a candidate likely to fit as the select parameter in the current method invocation; and recommending at least one of the candidates based on a highest probability for use in the source code program.

The method further comprises generating a scope score for each candidate based a scope attribute assigned to each candidate and a probability assigned to the scope attribute. The probability assigned to the scope attribute is based on a frequency of the current method invocation using the scope attribute in a select parameter position from a plurality of source code programs using the current method invocation. The scope attribute assigned to each candidate is based on features extracted from the source code program that correspond to a context of the method invocation and usage of the candidate.

The method further comprises generating an edit distance score for each candidate, the edit distance score measures a similarity of a name of a select variable and/or method to a name associated with the select parameter. The edit distance score is a weighted sum of an edit distance for each parameter of each method signature of the current method invocation. The weight for an edit distance is based on a frequency of usage of a method signature in training data of source code programs that utilize the current method invocation.

The method further comprises generating a declaration proximity score, the declaration proximity score represents a proximity of a location of a declaration of a candidate in the source code program to a location in the source code program of the current method invocation and applying a first weight to the scope score, a second weight to the edit distance score, and a third weight to the declaration proximity score, wherein each weight adjusts a respective score based on usage of the current method invocation in training data that uses the current method invocation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
   at least one processor and a memory;
   at least one module containing instructions that when executed by the at least one processor perform actions that:
   generate a candidate variable list of candidates, a candidate including a variable and/or a method in a source code program likely to fit as a parameter in a select parameter position of a current method invocation;
   calculate a score for each candidate of the candidate variable list, the score based on a weighted sum of a scope score, an edit distance score, and a declaration proximity, the weighted sum indicative of a probability of a candidate likely to fit in the select parameter position in the current method invocation, wherein the scope score represents probability of a scope attribute associated with the candidate fitting in the select parameter position, wherein the scope score is generated by a machine learning model given the scope attribute associated with the candidate, the current method invocation, and the select parameter position; and
   recommend at least one of the candidates based on a highest score overall of the candidates to use for the current method invocation of the source code program.

2. The system of claim 1, wherein the at least one module contains further instructions that when executed by the at least one processor perform actions that:
   generate the scope score for each candidate based the scope attribute assigned to each candidate and a probability assigned to the scope attribute.

3. The system of claim 2, wherein the probability assigned to the scope attribute is based on a frequency of the current method invocation using the scope attribute in a select parameter position from a plurality of source code programs using the current method invocation.

4. The system of claim 3, wherein the scope attribute assigned to each candidate is based on features extracted from the source code program that correspond to a context of the method invocation and usage of the candidate.

5. The system of claim 2, wherein the scope attribute is selected from one of method, property, local, field, literal, and parameter.

6. The system of claim 1, wherein the at least one module contains further instructions that when executed by the at least one processor perform actions that:
generate the edit distance score for each candidate, wherein the edit distance score measures a similarity of a name of a select variable and/or method to a name associated with the select parameter position.

7. The system of claim 6, wherein the edit distance score is a weighted sum of an edit distance for each parameter of each method signature of the current method invocation.

8. The system of claim 7, wherein the weighted sum for the edit distance is based on a frequency of usage of a method signature in training data of source code programs that utilize the current method invocation.

9. The system of claim 1, wherein the at least one module contains further instructions that when executed by the at least one processor perform actions that: generate the declaration proximity score, wherein the declaration proximity score represents a proximity of a location of a declaration of a candidate in the source code program to a location in the source code program of the current method invocation.

10. The system of claim 1 wherein the at least one module contains further instructions that when executed by the at least one processor perform actions that:
apply a first weight to the scope score, a second weight to the edit distance score, and a third weight to the declaration proximity score, wherein each weight adjusts a respective score based on usage of the current method invocation in training data that uses the current method invocation.

11. The system of claim 10, wherein the at least one module contains further instructions that when executed by the at least one processor perform actions that:
apply linear regression to determine the first weight, the second weight, and the third weight based on a label, a scope score, an edit score, and a declaration proximity score associated with candidates taken from training data of a plurality of source code programs using method invocations, wherein a candidate is associated with a label to indicate whether or not the candidate was used as a parameter in a method invocation in the training data of the plurality of source code programs.

12. A method performed in a device having at least one processor and a memory, the method comprising:
generating a candidate variable list of candidates, a candidate including variables and/or methods in a source code program likely to fit as a parameter in a select parameter position of a current method invocation;
calculating a score for each candidate of the candidate variable list, the score based on a weighted sum of a scope score, an edit distance score, and a declaration proximity, the weighted sum indicative of a probability of a candidate likely to fit as the select parameter position in the current method invocation, wherein the scope score represents probability of a scope attribute associated with the candidate fitting in the select parameter position, wherein the scope score is generated by a machine learning model given the scope attribute associated with the candidate, the current method invocation, and the select parameter position; and
recommending at least one of the candidates based on a highest score overall of the candidates to use for the current method invocation of the source code program.

13. The method of claim 12, further comprising:
generating the scope score for each candidate based the scope attribute assigned to each candidate and a probability assigned to the scope attribute.

14. The method of claim 13, wherein the probability assigned to the scope attribute is based on a frequency of the current method invocation using the scope attribute in a select parameter position from a plurality of source code programs using the current method invocation.

15. The method of claim 14, wherein the scope attribute assigned to each candidate is based on features extracted from the source code program that correspond to a context of the method invocation and usage of the candidate.

16. The method of claim 12, further comprising: generating the edit distance score for each candidate, wherein the edit distance score measures a similarity of a name of a select variable and/or method to a name associated with the select parameter position.

17. The method of claim 12, wherein the edit distance score is a weighted sum of an edit distance for each parameter of each method signature of the current method invocation.

18. The method of claim 17, wherein the weighted sum for an edit distance is based on a frequency of usage of a method signature in training data of source code programs that utilize the current method invocation.

19. The method of claim 12, further comprising: generating a declaration proximity score, wherein the declaration proximity score represents a proximity of a location of a declaration of a candidate in the source code program to a location in the source code program of the current method invocation.

20. The method of claim 19, further comprising:
applying a first weight to the scope score, a second weight to the edit distance score, and a third weight to the declaration proximity score, wherein each weight adjusts a respective score based on usage of the current method invocation in training data that uses the current method invocation.

* * * * *